March 25, 1947.  H. A. STRICKLAND, JR  2,418,056
INDUCTION HEATING COIL, ENERGIZING MEANS
THEREFOR AND WORK-RELEASE MEANS
Filed Aug. 13, 1943

INVENTOR
Harold A. Strickland, Jr.
BY John P. Tarbox
ATTORNEY

Patented Mar. 25, 1947

2,418,056

UNITED STATES PATENT OFFICE 2,418,056

INDUCTION HEATING COIL, ENERGIZING MEANS THEREFOR, AND WORK-RELEASE MEANS

Harold A. Strickland, Jr., Detroit, Mich., assignor, by mesne assignments, to The Budd Company, Philadelphia, Pa., a corporation of Pennsylvania Application August 13, 1943, Serial No. 498,459

6 Claims. (Cl. 219—13)

This invention relates to heating and timing apparatus for brazing, with particular application to the brazing of gas-tight joints in ferrous metal articles.

In certain manufacturing operations it is necessary to form a subsurface seal having gas-tight properties within the body of the article of manufacture. Such a process step is involved in the sealing of a threaded joint between the cap and the body of a shell designed for detonation, the cap usually being threaded to the body of the shell at the leading end thereof.

The objects of this invention may be summarized as follows: to provide heating means which may be readily applied to the interior of shells or the like for the principal purpose of fusing metal in brazing operations; to provide a heat treating apparatus for brazing which is automatically self-timing; to provide automatic brazing apparatus for shells and the like in which after completion of the heating step the shell or other workpiece is automatically removed from proximity to the heating apparatus. Other objects related to structure and method will appear on consideration of the following description and of the accompanying drawing in which:

Figure 1:
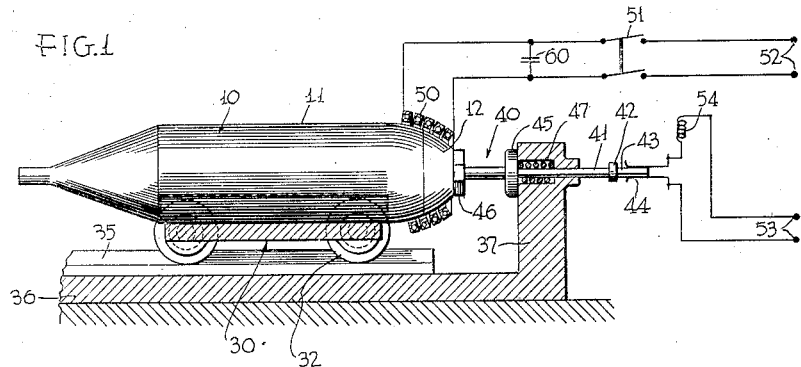
Fig. 1 is a diagrammatic view of a shell positioned in heating contact with the brazing apparatus.
Figure 4:
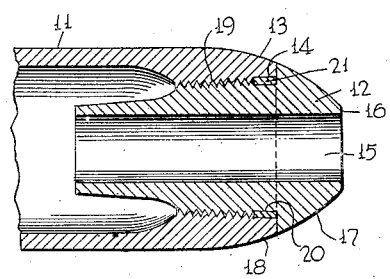
Fig. 4 is a sectional detail of a shell prior to the brazing operation and showing the solder ring in position.
Figure 5:
Fig. 5 is a view of the cross bar along lines 5—5 of Fig. 2.

By way of example, a shell 10 is illustrated in Fig. 1, the same having a body section 11 and a nose or cap section 12. As more clearly shown in Fig. 4, the shell body section 11 is hollow and the forward end 13 thereof is open and screw-threaded on its inner surface adjacent the end 13, there being a smooth annular inner recess 14 at the extreme limit of the end 13. The cap 12 is an elongated member having a central aperture 15 and a forward end roughly parabolic in general contour with a flat nose 16, the curvature 17 of the outer tip portion conforming to the curved outer surface 18 of the adjoining section of the body end 13. The mid-section of the cap 12 is outwardly screw-threaded as at 19 to engage the similarly threaded section on the inner surface of the body at the front end thereof. The threaded section 19 of the cap is radially inset from the adjacent outer periphery of the cap 12 and at the point of offset an annular groove or channel 20 is formed externally which is adapted to register with the channel 14 formed on the inner surface of the leading end 13 of the body to form a central cavity adapted to receive a solder ring 21 of silver, silver alloy or any other suitable composition for brazing purposes.

Figure 2:
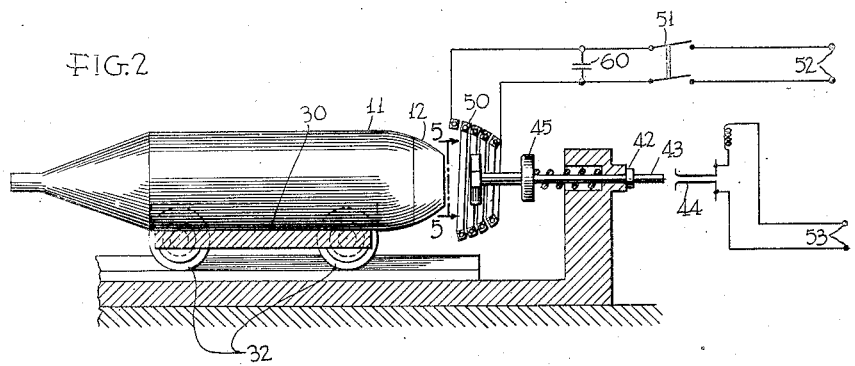
Fig. 2 is a view similar to Fig. 1 but with the shell in discharged position.
Figure 3:
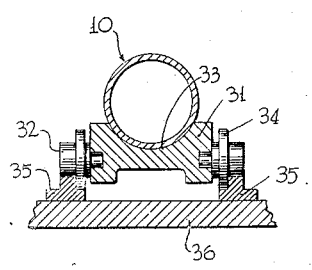
Fig. 3 is a detail in section showing the method of supporting the shell.

A shell of the type described may of course be of any desired dimensions but frequently they are of such a size as to require some means of support to facilitate movement into and from the heating unit. As illustrated, I have shown for this purpose a carriage 30 consisting of a body 31 of wood, metal or other substance having a length adequate for the support of the workpiece and mounted on wheels or rollers 32, a pair of the same being positioned at each end of the support 31. The longitudinal upper surface of the body 31 is channeled in such manner as to give a contour similar to that of the workpiece, the channel 33 being indicated. The rollers 32 are preferably shaped with flanges 34 so as to be retained on rails 35 as indicated in Fig. 3. With this means of support the workpiece may readily be moved along the track into or out of engagement with the heating unit. The rails 35 are mounted on a base 36 which may, as shown in Figs. 1 and 2, terminate at one end in an upstanding standard or block 37 adapted to receive the switch operating mechanism as will now be described.

The switch operating mechanism 40 includes a rod 41 slidably mounted upon the pillar 37. This rod is provided at either end with operating means for bringing about the energization or de-energization of the heating unit. At the forward end of the rod a collar 42 is placed beyond which extends a contact pin 43, the latter being adapted to make sliding contact with flexible switch elements 44. On the rear end of rod 41 there is secured a stop 45 and a contact plate 46. The stop 45 is adapted to engage the end of a coil spring 47 enclosed within the standard 37 in a cavity surrounding the control rod 41; the other end of the spring engages the forward end of the cavity so that normally the spring is under compression tending to force the control rod rearwardly to disengage the contact pin 43 from the slidable contact members 44 and simultaneously move the contact plate 46 rearwardly against the annular nose 16 of a shell 10 mounted on the carriage 30, thus tending to move the shell rearwardly on the track 35.

The electrical energization of the shell nose is accomplished by an inductor coil 50, the conductor being tubular and substantially square in cross section, and the coil being wound to conform to the general curvature of the cap of the shell so that when the shell is positioned with its nose 16 against the contact plate 46 and the spring 47 under compression the approximate axial center of the coil is in transverse alignment with the ring 21. By this means the induced heat is spread uniformly through the shell nose with reference to the ring thus accomplishing the efficient heating thereof and insuring an equable heat distribution to the silver ring 21.

The ends of coil 50 are connected through the double pole contactor 51 to a source of high frequency current 52, power factor correction being secured by capacitor 60. Also power is received from an appropriate source 53 for the operation of the control mechanism. The control mechanism includes the sliding spring switch 44 previously mentioned and circuit connections, including the contactor operating coil 54, for bringing about closure and opening of the main power circuit of the coil 50 upon closure and opening of switch 44 by means of the sliding contact pin 43.

As appears from the preceding description the operation of apparatus involves the mounting of the shell upon the carriage 30, the movement of the shell into operative relationship with the inductor 50, the simultaneous closure of slide switch 44 by the slide pin 41 moved under pressure of the cross bar 46 by the nose of the shell, the closure of the main power circuit by the control contactor 51, the energization of coil 50 and the consequent heating of the brazing ring 21 to the fusion temperature, and finally the automatic movement of the shell from operative position accompanied by opening of control switch 44 and the associated opening of the main power circuit in the control contactor 51.

An outstanding feature involved in the structural and circuital arrangements described is that controlling the automatic movement of the shell from operative position in the inductor unit as shown in Fig. 1 to the inoperative position of Fig. 2. This automatic movement is controlled by at least two agencies and possibly three. The first agent is the spring 47 which normally tends to force the shell away from operative position. However, this tendency is ordinarily restrained through the magnetic action of the inductor in relation to the ferromagnetic material of the shell cap, this action being such as to hold the shell closely in contact with the cross bar 46 and in operative position within the inductor. However, as the temperature of the cap and associated shell section increases the intensity of the magnetic action tends to diminish until, at the recalescence temperature all retractive magnetic action ceases between the shell cap and coil; hence at this point the spring 47 is free to exert its pressure on the shell nose and force the shell rearwardly on the track 35 to the position of Fig. 2. There is associated with this rearward shell movement a limited amount of motor action, the component of electro-magnetic forces resulting from the rapidly alternating flux of the coil in a non-magnetic coil conductor tending to force the conductor, that is shell and cap, out of the high density section of electro-magnetic flux.

Thus it appears that by the arrangement of Fig. 1 there is provided effective means for fusion of an embedded ring in a metallic joint of a movable unit and subsequently, by the means of reaching a temperature sufficient for fusion, securing a separation of the unit from the heating means and the opening of the heat circuit.

It is apparent that the description of the invention as set forth is diagrammatic in order to present the inventive features clearly. Obviously, modification of the invention may be made involving structural changes in the mode of supporting the shell, the precise configuration of the heating coil, the type of spring or gravity structure utilized for moving the contact pin 41 and other of the cooperating elements and therefore no limitation is intended by the structural elements as disclosed, other than may be included within the scope of the claims hereto appended.

What is claimed is:

1. In a brazing apparatus, an inductive heating coil positioned with its axis approximately horizontal, means for supporting a ferro-magnetic workpiece for reciprocating movement into and out of heating position within said coil, work-release means adapted to engage said workpiece when in position to be heated and tending to force said workpiece out of heating position; and power means for energization of said heating coil whereby said workpiece is held in heating position against the force of said work-release means and heat is supplied thereto.

2. In brazing apparatus, an inductive heating coil positioned with its axis approximately horizontal, means for supporting a ferro-magnetic workpiece for reciprocating movement into and out of heating position within said coil, work-release means adapted to engage said workpiece when in position to be heated and tending to force said workpiece out of heating position, and power means for energization of said heating coil whereby said workpiece is held in heating position against the force of said release means and heat is supplied thereto and means connected to, and operated by, said work-release means, for energization of said power means.

3. In brazing apparatus, an inductive heating coil positioned with its axis approximately horizontal, means for supporting a ferromagnetic workpiece for reciprocating movement into and out of heating position within said coil, work-release means adapted to engage said workpiece when in position to be heated and tending to force said workpiece out of heating position, and power means for energization of said heating coil whereby said workpiece is held in heating position against the force of said work-release means and heat is supplied thereto, said work-release means being effective to release the workpiece only on heating of the workpiece to the temperature of recalescence.

4. In brazing apparatus for ferromagnetic material, a heating coil, push-out means normally exerting pressure on a workpiece in heating position to force the same out of heating position, a circuit for simultaneous energization of said heating coil and retention of the workpiece in heating position, and switch means connected to said push-out means for closing said circuit when a workpiece is positioned in heating position, said push-out means being effective to move the workpiece out of heating position on demagnetization of said workpiece.

5. In brazing apparatus, a heating coil adapted to receive a section of a ferro-magnetic workpiece, a circuit for energization of said heating coil, said circuit including power-controlled switch mechanism, and circuit means for energization of said power-controlled mechanism, said means including a spring-operated push-out rod, a contact plate on one end of said rod adapted to engage the workpiece when in heat treating position against the force of said spring and switch means on the other end of said rod adapted, when the rod is moved to heat treating position, to energize said circuit means, said rod forcing said workpiece away from the heating coil after demagnetization of the workpiece.

6. In apparatus for brazing a ferro-magnetic workpiece, a heating coil, circuit connections to said coil whereby energy for heating and holding the workpiece in operative position within the coil are supplied, push-out means positioned adjacent one end of said coil, operative to remove the workpiece automatically from heating position when the temperature thereof approximates that of recalescence, comprising a reciprocable rod movable to inner and outer positions, and spring means for urging the rod in a direction toward the workpiece to the inner position thereof, and switch means operated by the rod of said push-out means when in outer position for closing said circuit connections, said push-out rod being forced to outer position by insertion of the workpiece.

HAROLD A. STRICKLAND, Jr.

REFERENCES CITED

The following references are of record in the file of this patent:

UNITED STATES PATENTS

| Number | Name | Date |
|---|---|---|
| 1,101,527 | Denhard | June 30, 1914 |
| 2,277,564 | Somes | Mar. 24, 1942 |